US008143735B2

(12) United States Patent
Bauer

(10) Patent No.: US 8,143,735 B2
(45) Date of Patent: Mar. 27, 2012

(54) ELECTRIC STARTING DEVICE FOR AN INTERNAL COMBUSTION ENGINE

(75) Inventor: Hans Bauer, Wilhermsdorf (DE)

(73) Assignee: Schaeffler KG, Herzogenaurach (DE)

( * ) Notice: Subject to any disclaimer, the term of this patent is extended or adjusted under 35 U.S.C. 154(b) by 424 days.

(21) Appl. No.: 12/393,120

(22) Filed: Feb. 26, 2009

(65) Prior Publication Data

US 2009/0212569 A1 Aug. 27, 2009

(30) Foreign Application Priority Data

Feb. 27, 2008 (DE) ........................ 10 2008 011 479

(51) Int. Cl.
*F02N 11/04* (2006.01)
*H02K 23/52* (2006.01)

(52) U.S. Cl. ................ 290/47; 290/10; 290/22; 290/31; 290/36 R

(58) Field of Classification Search .................... 290/10, 290/22, 31, 36 R, 47
See application file for complete search history.

(56) References Cited

U.S. PATENT DOCUMENTS

| | | | | |
|---|---|---|---|---|
| 7,165,523 | B1 * | 1/2007 | Richard | 123/179.3 |
| 2004/0072643 | A1 * | 4/2004 | Berndt et al. | 474/135 |
| 2006/0240926 | A1 * | 10/2006 | Wiesneth et al. | 474/166 |
| 2006/0287146 | A1 * | 12/2006 | McVicar et al. | 474/109 |
| 2007/0200346 | A1 * | 8/2007 | Kanazawa et al. | 290/40 B |

* cited by examiner

*Primary Examiner* — Quyen Leung
*Assistant Examiner* — Jose Gonzalez Quinones
(74) *Attorney, Agent, or Firm* — Lucas & Mercanti, LLP

(57) ABSTRACT

The present invention relates to an electric starting device (1) for an internal combustion engine (5), which electric starting device (1) comprises an electric starter (4) and a starter-generator (2) which is assigned to a traction mechanism drive (3). The starting of the internal combustion engine (5) may take place by means of the electric starter (4) or the starter-generator (2) in each case individually or in a combination of the two units. Also provided is a start-stop device of the internal combustion engine (5), in which a controlled supply of power to the starter-generator (2) is provided in synchronization with a start by means of the electric starter (4).

11 Claims, 2 Drawing Sheets

ELECTRIC STARTING DEVICE FOR AN INTERNAL COMBUSTION ENGINE

This application claims the priority of DE 10 2008 011 479.0 filed Feb. 27, 2008 which is incorporated by reference herein.

FIELD OF THE INVENTION

The invention relates to an electric starting device for an internal combustion engine, which electric starting device comprises an electric starter and a starter-generator which is assigned to a traction mechanism drive. The starter-generator can be provided for starting according to demand in a starting phase of the internal combustion engine. The starter-generator is designed for generating energy after the internal combustion engine has been started. The starting device provides that the electric starter can be operated alone or together with the starter-generator.

BACKGROUND OF THE INVENTION

For starting an internal combustion engine, it is conventional to use an electric starter which, during the starting phase, is operatively connected by means of a starting pinion to a toothed ring of a flywheel which is assigned directly to the crankshaft of the internal combustion engine. Said electric starters have a torque characteristic which is comparable to a series-wound machine, wherein from a maximum possible torque, an output torque decreases sharply with rising rotational speed.

DE 32 41 079 A1 discloses a starting device, which comprises two starters, of an internal combustion engine, which starters are in each case activated together during all starting processes. In EP 0 406 182 B1, the starting device comprises a boost circuit, by means of which a higher voltage can be generated for starting, which higher voltage briefly generates higher currents in the motor-driven electric machine, and thereby increases the torque. Said solution has the disadvantage that, at low temperatures, the slipping tendency of the belt drive increases. Furthermore, the charging time of the starting battery is a problem, as a result of which it is not possible to carry out starting processes one after the other at short intervals.

DE 100 45 143 A1 discloses a tensioning system, which comprises two pulleys, of a traction mechanism drive, which tensioning system can be used for a starter-generator concept. In the starter-generator, a change in direction of the torque which is introduced into the traction mechanism drive takes place as a function of the operating mode. On account of the alternately-directed torque, the traction mechanism drive requires a tensioning system which comprises two pulleys and which pre-tensions in each case the idle strand, which is assigned to the starter-generator, of the traction mechanism with a sufficient resilience. The tensioning system comprises two lever arms which are connected to one another in a rotationally rigid fashion and on which separate pulleys are arranged. In this way, in the operational state of the internal combustion engine, a reaction is generated at all times between the tensioning rollers assigned to the idle strand and to the tension strand. A deflection of the pulley which is assigned to the tension strand generates a corresponding counter-torque, as a result of which a support force of the pulley which is assigned to the idle strand is increased.

OBJECT OF THE INVENTION

The problem on which the present invention is based is that of optimizing a cold start of internal combustion engines having an electric starter.

SUMMARY OF THE INVENTION

The above-stated problem is solved according to the invention by a start-stop device in which, to start the internal combustion engine, the starter-generator is supplied with power in a controlled manner in synchronization with the actuation of the electric starter. In this way, it is possible for a defined torque to be introduced into the traction mechanism drive by means of the starter-generator, as a result of which the drive dynamics are improved and the start phase can advantageously be significantly shortened in particular during a cold start. In contrast to previously known automated start-stop devices of internal combustion engines, in which the electric starter is actuated to start the internal combustion engine at low temperatures and the starter-generator is actuated to start the internal combustion engine at higher temperatures, it is possible to realize advantageously improved drive dynamics by means of the controlled supply of power, according to the invention, to the starter-generator.

As a result of the principle according to the invention, the starter-generator accelerates automatically, as a result of which a certain degree of synchronization of the crankshaft rotational speed to the starter-generator rotational speed is obtained and, in the process, the traction mechanism drive, in particular the traction mechanism, is advantageously relieved of load. Independently of the controlled supply of power to the starter-generator during a cold start, it is also possible according to the invention for a start of the internal combustion engine to take place, dependent on the ambient temperature, solely by means of the electric starter or solely by means of the starter-generator. The measure according to the invention can advantageously be implemented in a cost-effective manner without a high degree of excess expenditure.

A regulated supply of power to the starter-generator is preferably provided during a cold start. Here, the regulation takes place in particular as a function of the rotational speed of the internal combustion engine. Here, it may for example be achieved that, in order to obtain an optimally-configured power consumption or to avoid an excess provision of power, the supply of power to the starter-generator may already be reduced or ended after a short time interval, that is to say after the breakaway torque of the internal combustion engine has been overcome. Alternatively, it is possible to provide regulation by means of which the supply of power takes place as a function of the rotational speed of the internal combustion engine.

According to the invention, as an alternative to an automated supply of power to the starter-generator during a cold start, it is possible to provide a start-stop device in which the supply of power to the starter-generator is triggered by means of a manual actuation. Said actuation makes it possible to provide the supply of power for example also during a warm start of the internal combustion engine if the latter has a sluggish starting behavior.

The starting device according to the invention preferably comprises an electric starter which interacts by means of a pinion with a toothed ring of the internal combustion engine. For this purpose, the electric starter is in particular arranged on the main drive-output side of the internal combustion engine, and is operatively connected by means of the pinion to the toothed ring which is directly and rotationally rigidly connected to the flywheel of the internal combustion engine.

As a traction mechanism drive, provision is made in particular for a belt drive in which, as a traction mechanism, a belt connects all the associated pulleys of the drive-output and drive-input elements. The traction mechanism drive provides that each traction mechanism strand which is assigned to the starter-generator is assigned a separate tensioning system, which tensioning systems comprise separate pulleys, the arrangement and adjustment of which takes place independently of one another.

If required, the starting device according to the invention encompasses a tensioning system which can be locked according to demand. It is thereby ensured that, in the starting phase of the starter-generator, the tensioning system which is assigned to the tension strand is fixed in position. The traction mechanism drive preferably comprises a hydraulically acting tensioning system. Alternatively, it is expedient to use a mechanical tensioning system or a combination of a mechanical and a hydraulic tensioning system.

The design of the starting device according to the invention may also encompass a starter-generator with an integrated overrunning clutch, by means of which the starter-generator is connected to the traction mechanism drive. It is advantageously expedient to use a lockable overrunning clutch in order to ensure a delay-free or slip-free start in the starting phase. For this purpose, the overrunning clutch is preferably integrated, in an installation-space-optimized fashion, in a pulley which is assigned to the starter-generator.

BRIEF DESCRIPTION OF THE DRAWINGS

The present invention will be explained on the basis of drawings which are described in more detail below, and in which.

DETAILED DESCRIPTION OF THE DRAWINGS

Figure 1:
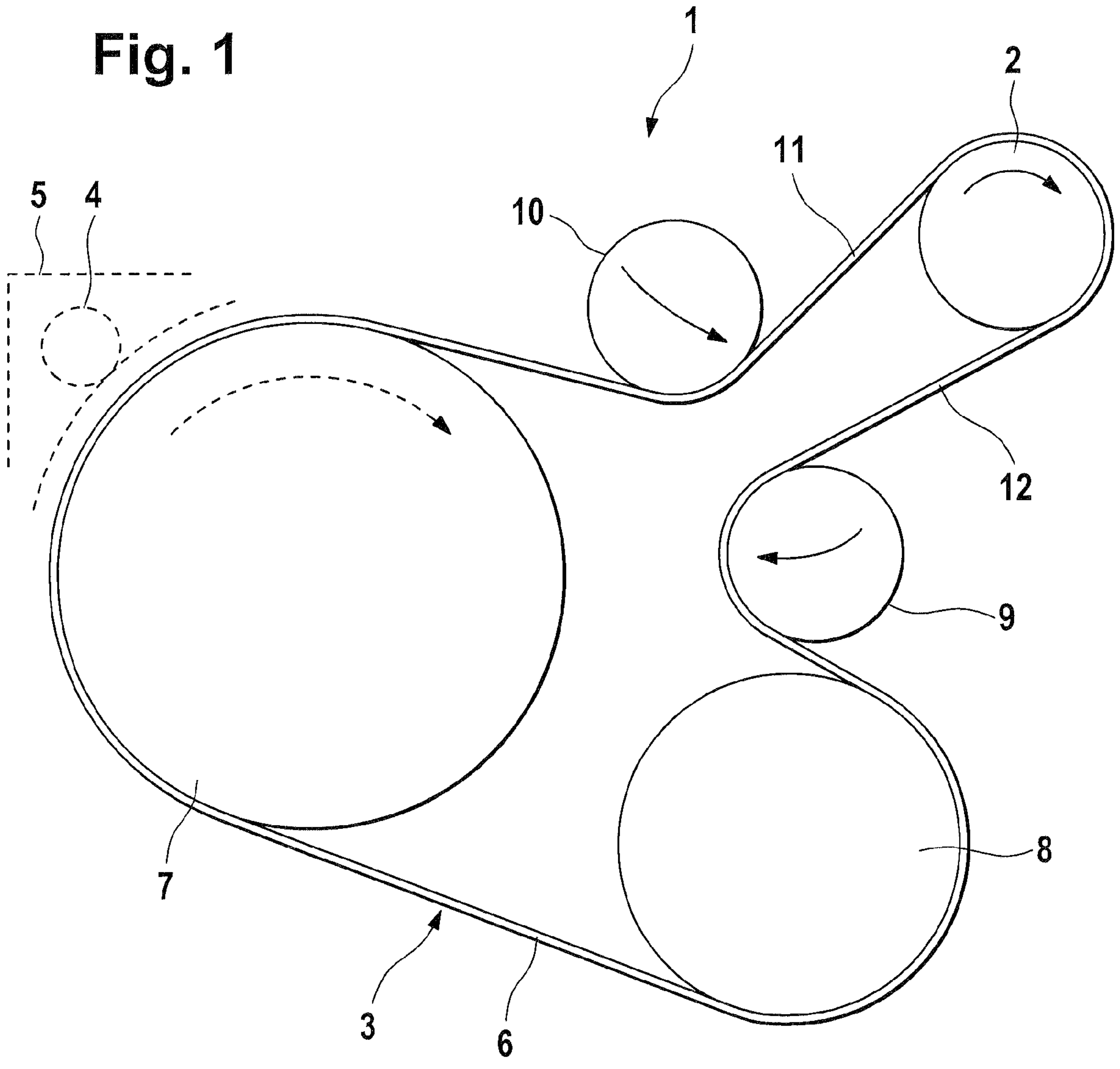
FIG. 1 shows a schematic illustration of an electric starting device according to the invention for an internal combustion engine.

According to FIG. 1, the electric starting device 1 comprises a starter-generator 2, which is assigned to a traction mechanism drive 3, and a conventional electric starter 4. As is clear from FIG. 2, the traction mechanism drive 3 and therefore the starter-generator 2 are assigned to a first end side of an internal combustion engine 5 and the electric starter 4 is assigned to a second end side of an internal combustion engine 5. The traction mechanism drive 3, which is designed as a belt drive, serves as an assembly drive of the internal combustion engine 5. Here, a traction mechanism 6 connects pulleys of the crankshaft 7, of an air-conditioning compressor 8 and of the starter-generator 2. To obtain a sufficient pre-tension in the traction mechanism 6, the traction mechanism drive 3 encompasses two separate tensioning systems 9, 10 which act independently of one another. The starting of the internal combustion engine 5 may take place either exclusively by means of the electric starter 4 or exclusively by means of the starter-generator 2. For starting the internal combustion engine 5, the starting device 1 also comprises the combination of an electric starter 4 and a starter-generator 2. In the event of a start of the internal combustion engine 5 exclusively by means of the starter-generator 2, the belt strand 11 forms the tension strand and the belt strand 12 forms the idle strand, wherein to obtain a sufficient transmission of force, the tensioning system 10 is preferably lockable and thereby fixed in terms of position. In the event of a start of the internal combustion engine 5 by means of the electric starter 4, a torque reversal is generated in the belt strands 11, 12, with the belt strand 12 forming the tension strand and the belt strand 11 forming the idle strand. In said operating state, the tensioning system 9 is preferably fixed, with the sufficient pre-tension of the traction mechanism 6 being ensured by means of the tensioning system 10.

Figure 2:
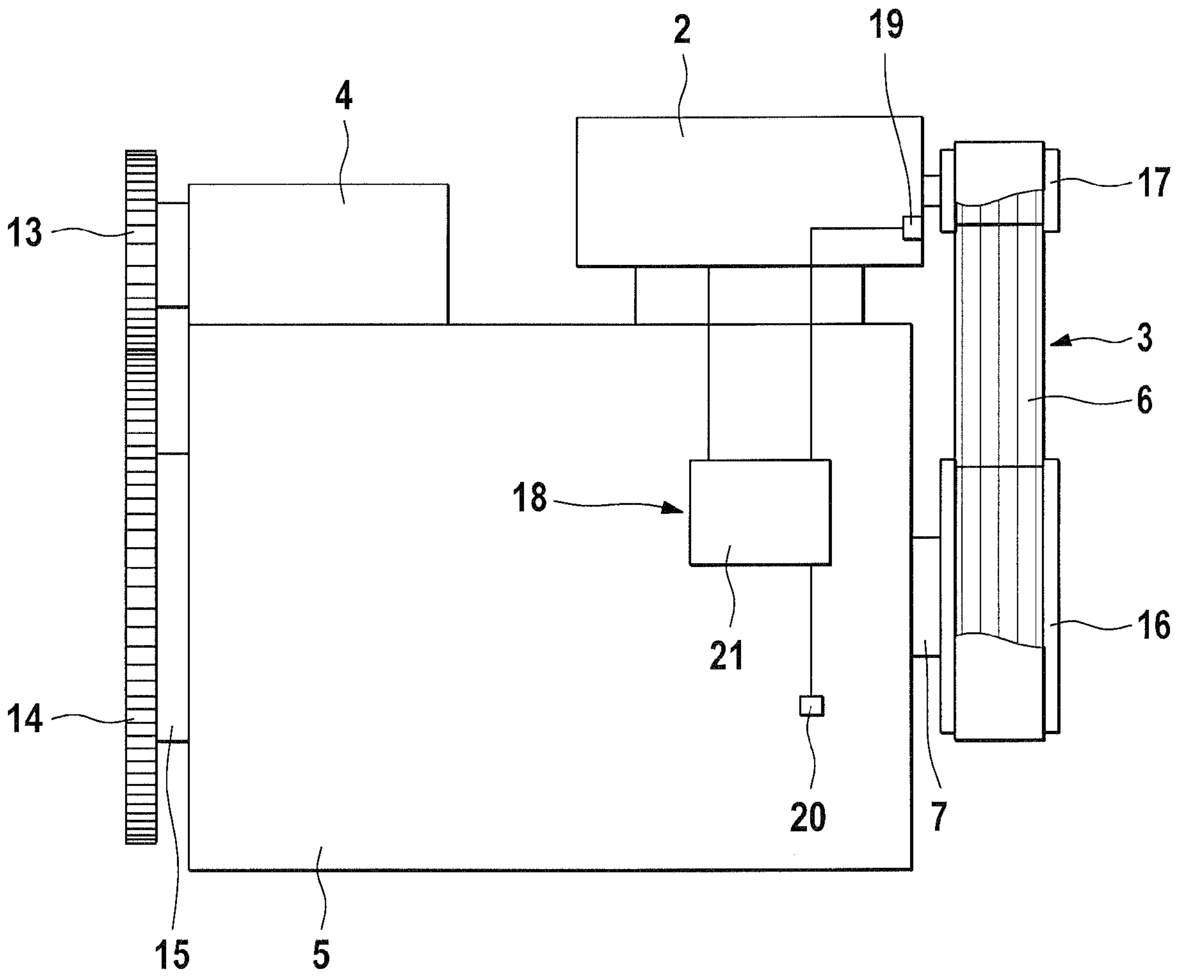
FIG. 2 shows an internal combustion engine in a side view, with the electric starting device being divided between the two end sides of the internal combustion engine.

Further details of the electric starting device 1 are shown in FIG. 2. According to said Figure, in the start phase, the electric starter 4 is connected in a form-fitting manner by means of a pinion 13 to a toothed ring 14 which is assigned to a flywheel 15 of the internal combustion engine 5. Once a starting rotational speed has been reached and the internal combustion engine 5 has been started, the pinion 13 is moved axially in relation to the toothed ring 14, and the engagement between said pinion 13 and toothed ring 14 is broken. The traction mechanism drive 3 is assigned to the end side opposite from the fly wheel 15 of the internal combustion engine 5; of the traction mechanism drive 3, FIG. 2 shows the traction mechanism 6 and a pulley 16, which is assigned to the crankshaft 7, and a pulley 17 of the starter-generator 2. According to the invention, to obtain a controlled supply of power to the starter-generator 2 in the starting phase, the electric starting device 1 comprises a regulator 18. It is thereby possible to obtain a controlled supply of power to the starter-generator 2 in order to optimize the drive dynamics of the traction mechanism drive 3 in a targeted fashion. The regulator 18 comprises at least one sensor 19 which measures the rotational speed of the traction mechanism drive 3 and which, for this purpose, is for example positioned in the region of the pulley 17 which is assigned to the starter-generator 2. Alternatively or in addition, it is expedient to provide a further sensor 20 which serves to measure, for example, the ambient temperature or the lubricant temperature of the internal combustion engine 5. The measurement variables of the sensors 19, 20 are supplied to a control unit 21 of the regulator 18, by means of which, according to demand, the starter generator 2 can be supplied with power in a controlled fashion in the starting phase, in particular during a cold start of the internal combustion engine 5.

LIST OF REFERENCE SYMBOLS

1 Starting device
2 Starter-generator
3 Traction mechanism drive
4 Electric starter
5 Internal combustion engine
6 Traction mechanism
7 Crankshaft
8 Air-conditioning compressor
9 Tensioning system
10 Tensioning system
11 Belt strand
12 Belt strand
13 Pinion
14 Toothed ring
15 Flywheel
16 Pulley
17 Pulley
18 Regulator
19 Sensor

20 Sensor
21 Control unit

The invention claimed is:

1. An electric starting device for an internal combustion engine, comprising:

a starter-generator which is assigned to a traction mechanism drive and is designed for starting according to demand in a starting phase and for generating energy after the internal combustion engine has been started, the starter-generator being arranged at a first end of a first side of the internal combustion engine and connected to the internal combustion engine by a first means;

an electric starter which can be operated alone or together with the starter-generator, the electric starter being arranged at a second end of the first side of the internal combustion engine, opposite the first end, and connected to the internal combustion engine by a second means;

a further means for providing a controlled supply of power to the starter-generator in synchronization with an actuation of the electric starter for a cold start, wherein the starting device is a start-stop device of the internal combustion engine.

2. The starting device according to claim 1, wherein the starter-generator is supplied with power in a regulated fashion.

3. The starting device according to claim 1, wherein, in the starting phase, the power supply to the starter-generator is triggered by means of a manual actuation.

4. The starting device according to claim 1, wherein the electric starter interacts by means of a pinion with a toothed ring of the internal combustion engine.

5. The starting device according to claim 1, wherein the traction mechanism drive is a belt drive.

6. The starting device according to claim 1, wherein two belt strands of the starter-generator are each assigned separate, an independently acting tensioning system.

7. The starting device according to claim 6, wherein, in the starting phase, the tensioning system of one of the belt strands, which acts as a tension strand, can be locked.

8. The starting device according to claim 6, wherein at least one tensioning system is a hydraulically acting tensioning system.

9. The starting device according to claim 1, wherein the starter-generator is connected to the traction mechanism drive by means of an overrunning clutch.

10. The starting device according to claim 9, wherein the overrunning clutch, which is lockable, is provided between the starter-generator and the traction mechanism drive.

11. The starting device according to claim 10, wherein the overrunning clutch is integrated in a pulley which is assigned to the starter-generator.

* * * * *